(12) United States Patent
Shan et al.

(10) Patent No.: US 8,773,951 B2
(45) Date of Patent: Jul. 8, 2014

(54) SYSTEM AND METHOD FOR SEISMIC IMAGING WITH REDUCED COMPUTATIONAL COST

(75) Inventors: Guojian Shan, San Ramon, CA (US); Linbin Zhang, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 392 days.

(21) Appl. No.: 13/051,186

(22) Filed: Mar. 18, 2011

(65) Prior Publication Data

US 2012/0236685 A1 Sep. 20, 2012

(51) Int. Cl.
  *G01V 1/28* (2006.01)
(52) U.S. Cl.
  CPC ........................................ *G01V 1/28* (2013.01)
  USPC ..................... 367/50; 367/73; 702/14; 702/16
(58) Field of Classification Search
  USPC .................................. 367/50, 73; 702/14, 16
  See application file for complete search history.

(56) References Cited

U.S. PATENT DOCUMENTS

| | | | |
|---|---|---|---|
| 6,763,305 B2* | 7/2004 | Bernitsas | 367/38 |
| 7,542,373 B2* | 6/2009 | Wang | 367/27 |
| 8,385,151 B2* | 2/2013 | Liu | 367/50 |
| 2006/0018526 A1 | 1/2006 | Avinsah | |
| 2009/0103677 A1 | 4/2009 | Wood et al. | |
| 2010/0299071 A1* | 11/2010 | Kiyashchenko et al. | 702/16 |
| 2010/0302906 A1* | 12/2010 | Liu | 367/59 |
| 2011/0085413 A1* | 4/2011 | Keers et al. | 367/21 |
| 2011/0096627 A1* | 4/2011 | Hill | 367/73 |
| 2012/0072117 A1* | 3/2012 | Loddoch et al. | 702/16 |

OTHER PUBLICATIONS

Shipp, R., & Singh, S., 2002. Two-dimensional full-wavefield inversion of wide-aperture marine seismic streamer data. Geophys. J. Int., 151, 325-344.

Roberts, M.A., 2007, Full waveform inversion of walk-away VSP data, PhD. thesis, Department of Earth Sciences, University of Cambridge.

* cited by examiner

Primary Examiner — Ian J Lobo
(74) Attorney, Agent, or Firm — Marie L. Clapp

(57) ABSTRACT

A computer-implemented method, system, and article of manufacture for generating images of a subsurface region are disclosed. The method includes obtaining seismic data and an earth model related to the subsurface region, forward propagating a source wavefield through the earth model for a limited time range dependent on a first travel time and a second travel time, backward propagating a receiver wavefield through the earth model for the limited time range dependent on the first travel time and the second travel time, and applying an imaging condition to the forward propagated source wavefield and backward propagated receiver wavefield to generate images related to the subsurface region. The first travel time is a length of time taken by seismic energy to travel from a seismic source to an image point in the subsurface region and the second travel time is a length of time taken by seismic energy to travel from a seismic receiver to the image point in the subsurface region. The limited time range is between the first travel time and the second travel time subtracted from a maximum travel time.

7 Claims, 5 Drawing Sheets

SYSTEM AND METHOD FOR SEISMIC IMAGING WITH REDUCED COMPUTATIONAL COST

TECHNICAL FIELD

The present invention relates generally to methods and systems for seismic imaging of the earth's subsurface, and in particular, methods and systems for performing seismic processing such as reverse time migration at a reduced computational cost.

BACKGROUND OF THE INVENTION

Many prior art migration and inversion methods belong to the class of adjoint state problems where forward and backward propagated wavefields are correlated to obtain an image. Examples of such methods include reverse time migration and waveform inversion. These methods require that forward propagated wavefields be accessed in reverse order, in lock-step with the adjoint, backward-propagated wavefields at each time step.

This requirement of simultaneous availability of both the forward and backward-propagated wavefields at each time step poses significant computational challenges for large datasets. Calculating the source and receiver wavefields at every point in the subsurface for every time step has huge requirements in both computational operations and computer memory. Prior art has addressed this problem by reducing the wavefield computations according to an expanding box, wherein for each time step, the wavefield is only calculated for subsurface points that contain the expanding wavefield. At subsurface points outside the expanding box, the wavefield is known to be zero, so there is no need to calculate it. This methodology can save up to 30% of the computational cost of reverse time migration. However, even when using an expanding box for the wavefield propagation, the computational cost of methods such as reverse time migration and waveform inversion is very high.

An expanding box for source wavefield propagation is illustrated by FIG. 1. Panel 10 shows a source wavefield that is being propagated. The majority of the panel is dark gray, indicating that the source wavefield is not calculated in that region and that it is presumed to be zero. The source wavefield is only calculated in the light gray region, which is slightly larger than the actual wavefield, thereby ensuring that the entire wavefield is computed. The propagating wavefield in panel 10 is the half-circle centered at the top of the panel. As the wavefield forward propagates to later times in panels 12 and 14, the light gray region expands to allow the wavefield to be calculated within this expanding box and the dark gray region where the wavefield is held to be zero decreases in size. Due to the complexity of the earth model that the wavefield is being propagated through, the expanding box expands at different rates in different directions and the wavefield becomes complex. The backward propagated receiver wavefield can be similarly calculated within an expanding box. Although the expanding box for source and receiver wavefield propagation can reduce the computational cost by up to 30%, seismic imaging methods such as reverse time migration are still computationally expensive.

There exists a need to process wavefields and to generate images of a subsurface region of interest in a more efficient computational manner.

SUMMARY OF THE INVENTION

According to one implementation of the present invention, a computer-implemented method for generating images of a subsurface region is disclosed. The method includes obtaining seismic data and an earth model related to the subsurface region, forward propagating a source wavefield through the earth model for a limited time range dependent on a first travel time and a second travel time, backward propagating a receiver wavefield through the earth model for the limited time range dependent on the first travel time and the second travel time, and applying an imaging condition to the forward propagated source wavefield and backward propagated receiver wavefield to generate images related to the subsurface region. The first travel time is a length of time taken by seismic energy to travel from a seismic source to an image point in the subsurface region and the second travel time is a length of time taken by seismic energy to travel from a seismic receiver to the image point in the subsurface region. The limited time range is between the first travel time and the second travel time subtracted from a maximum travel time.

In an embodiment, a system for generating images of a subsurface region is disclosed. The system includes a data source containing information related to the subsurface region and at least one computer processor being configured to communicate with the data source and to execute computer program modules including a forward propagation module, a backward propagation module, and an imaging condition module. The system may also include a user interface. The forward propagation module and the backward propagation module are configured to propagate wavefields for a limited time range dependent on a first travel time and a second travel time. The first travel time is a length of time taken by seismic energy to travel from a seismic source to an image point in the subsurface region and the second travel time is a length of time taken by seismic energy to travel from a seismic receiver to the image point in the subsurface region. The limited time range is between the first travel time and the second travel time subtracted from a maximum travel time.

In another embodiment, an article of manufacture for generating images of a subsurface region is disclosed. The article of manufacture may include a computer readable medium having a computer readable code embodied therein, the computer readable program code adapted to be executed to implement a method for estimating fluid distribution in a subterranean reservoir. The method may include forward propagating a source wavefield through the earth model for a limited time range dependent on a first travel time and a second travel time, backward propagating a receiver wavefield through the earth model for the limited time range dependent on the first travel time and the second travel time, and applying an imaging condition to the forward propagated source wavefield and backward propagated receiver wavefield to generate images related to the subsurface region. The first travel time is a length of time taken by seismic energy to travel from a seismic source to an image point in the subsurface region and the second travel time is a length of time taken by seismic energy to travel from a seismic receiver to the image point in the subsurface region. The limited time range is between the first travel time and the second travel time subtracted from a maximum travel time.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present invention will become better understood with regard to the following description, pending claims and accompanying drawings where:

DETAILED DESCRIPTION OF THE INVENTION

Figure 1:
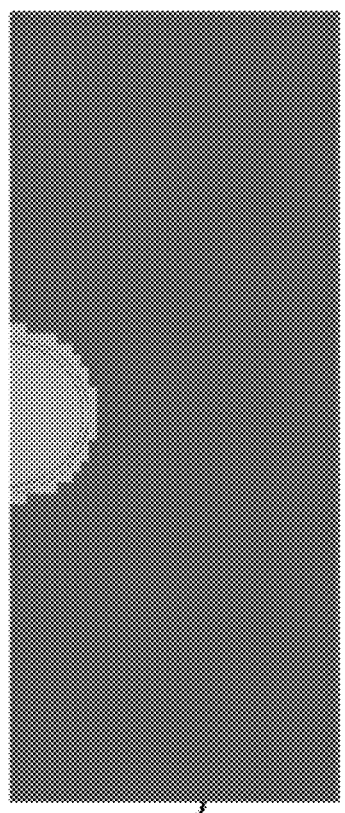
FIG. 1 demonstrates the prior art of an expanding box for propagating the source wavefield.
Figure 1:
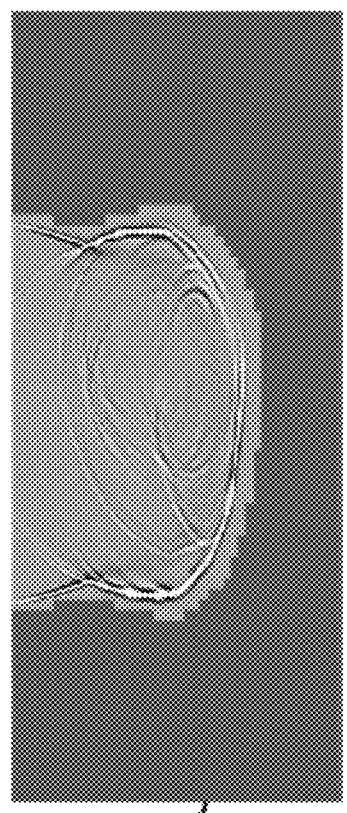
Figure 1:
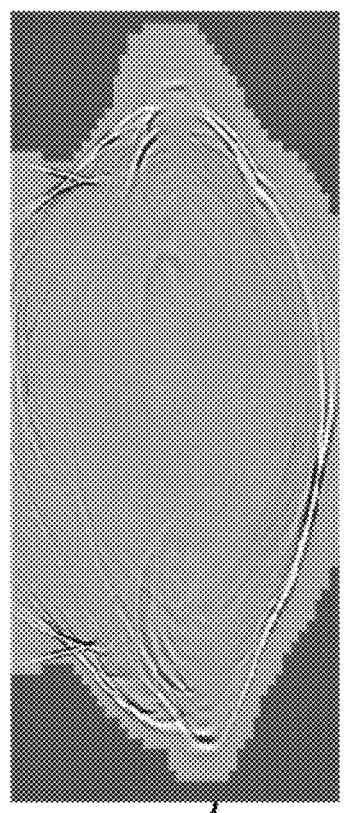

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple computer processors, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

The present invention relates to seismic imaging of the earth's subsurface and, by way of example and not limitation, can be used to reduce the computational cost of seismic imaging by reverse time migration or waveform inversion. This may be accomplished through the use of a dual-expanding box which limits the time range over which the source and receiver wavefields are calculated.

Figure 2:
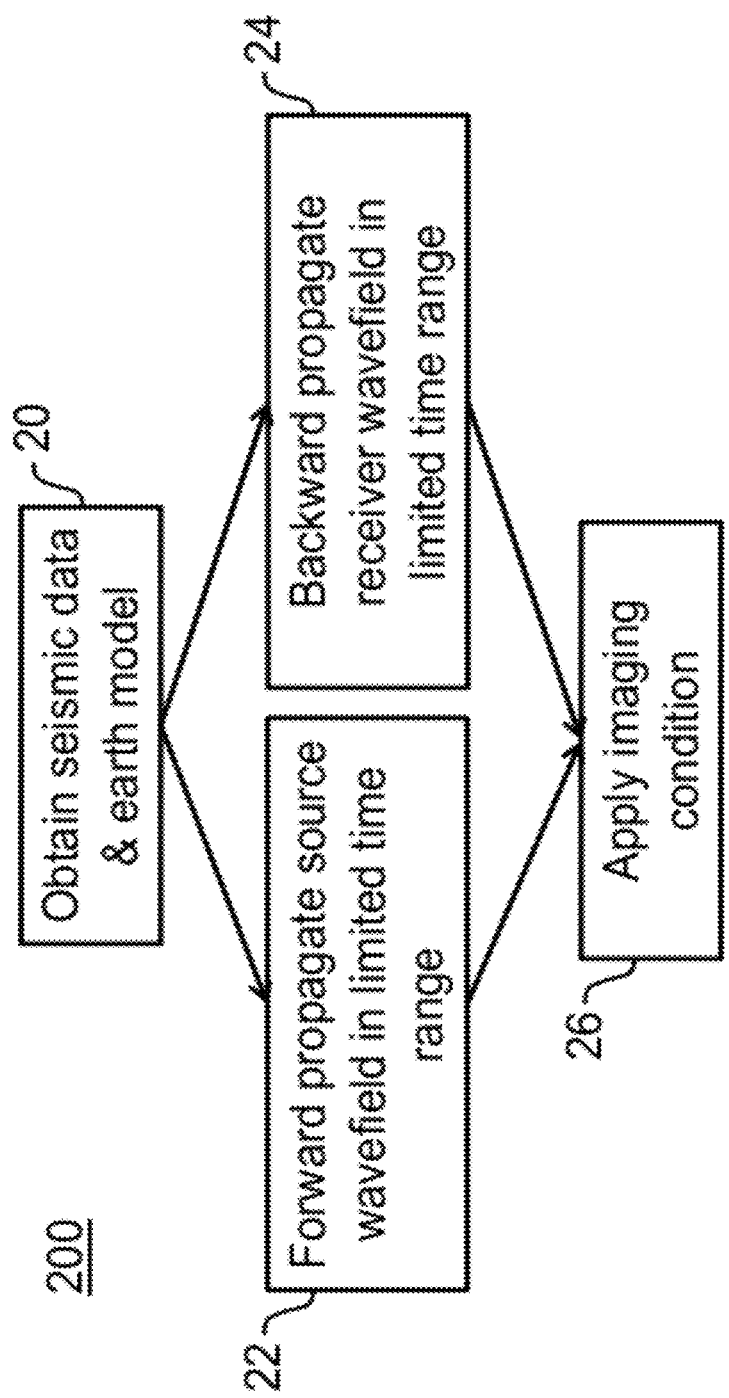
FIG. 2 is a flowchart illustrating a method in accordance with an embodiment of the invention.

The present invention uses a dual-expanding box to reduce the computational cost of seismic wave propagation during seismic processing such as reverse time migration. In this regard, an example of a method 200 in accordance with the present invention is illustrated in the flowchart of FIG. 2. At step 20, seismic data and an earth model is obtained. The earth model includes the information about the subsurface attributes that are needed to forward and backward propagate the source and receiver wavefields. It may include, for example, any of these attributes: seismic velocity, density, and/or anisotropic parameters. The seismic data may be obtained directly from a seismic survey or may be obtained by transmitting, storing or delivering the seismic data through network connections, computer hard disk, USB devices, and the like. Alternatively, the seismic data may be synthetic seismic data obtained through seismic data modeling such as finite difference modeling. The earth model may also be obtained by transmitting, storing or delivering the subsurface attributes through network connections, computer hard disk, USB devices, and the like, or may be obtained by modeling done prior to the steps of the present invention.

At step 22, the source wavefield is propagated through a limited time range. The receiver wavefield is propagated through the same limited time range at step 24, which may occur before, after or concurrently with step 22. In the case of reverse time migration, step 22 may be done, for example, with a finite difference modeling algorithm based on a finite difference solution to a wave equation, moving forward in time. Step 24 might be done, for example, by finite difference modeling backwards in time. The limited time range for both the forward and backward propagation is described with reference to FIG. 3.

Figure 3:
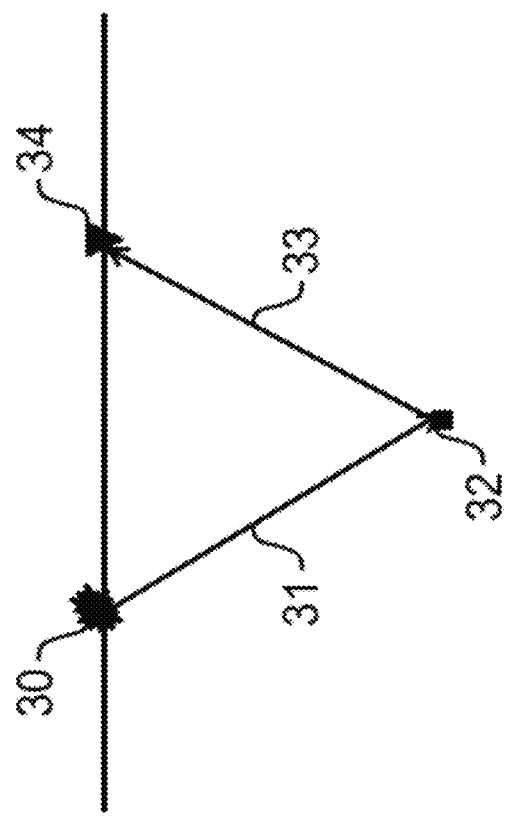
FIG. 3 is a diagram displaying the travel times used in accordance with an embodiment of the invention.

The travel times used by the present invention to determine the extent of the calculations for the forward and backward propagating wavefields are shown in FIG. 3. The source 30 is where a wave begins propagating to image point 32. The amount of time it takes for the forward propagated wave to travel from the source 30 to the image point 32 is $t_1$, represented by line 31. The receiver 34 is the point from which the receiver wavefield is backward propagated to image point 32. The amount of time it takes for the backward propagated receiver wavefield to travel from the receiver 34 to the image point 32 is $t_2$, represented by line 33. The maximum traveltime recorded at the receiver is T.

Now consider the source and receiver wavefields at the image point 32. The forward propagation of the source wavefield begins at source 30 at time 0 and proceeds forward in time. The backward propagation of the receiver wavefield begins at receiver 34 at time T and proceeds backward in time. The source wavefield and receiver wavefield is zero everywhere until the propagation arrives; this means that for image point 32, the source wavefield will be zero until time $t_1$ and the receiver wavefield will be zero until time $T-t_2$. As the forward and backward propagation continues, the source and receiver wavefields will continue to be non-zero and therefore must be calculated at the image point 32.

Referring again to FIG. 2, at step 16 an imaging condition is applied to the source and receiver wavefields. In the case of reverse time migration, this imaging condition is often a zero-lag cross-correlation. When applying such an imaging condition at the image point 32 in FIG. 3, where the source wavefield is zero until time $t_1$ and the receiver wavefield is zero until time $T-t_2$, the zero-lag cross-correlation will be zero for times less than $t_1$ and greater than $T-t_2$. Therefore, to obtain an image for image point 32, the source and receiver wavefields only need to be calculated for times between $t_1$ and $T-t_2$. For both the source and receiver wavefield propagation, the computing area initially grows, then becomes smaller. Therefore, in the case of reverse time migration, the present invention may save about 60% of whole migration cost.

Figure 4:
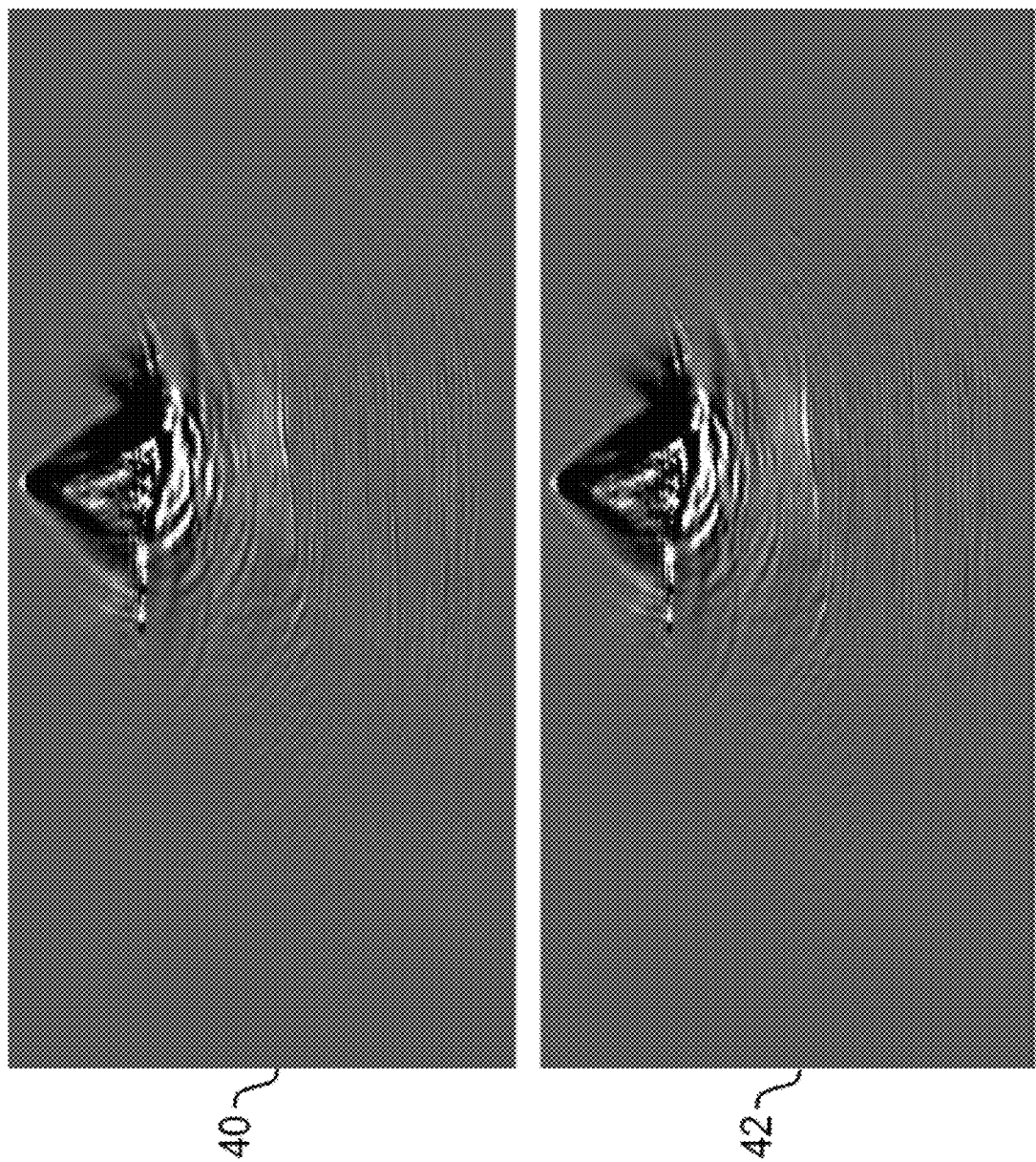
FIG. 4 illustrates the result of using an embodiment of the invention.

The results of using the present invention can be seen in FIG. 4. Panel 40 shows the result of reverse time migration of a single shot wherein the source and receiver wavefields were calculated for all times at all imaging points. Panel 42 shows the result of using the present invention in which the source and receiver wavefields are calculated in a limited time range. The result in panel 42 required only 40% of the computations of panel 40 and the results are substantially the same.

Figure 5:
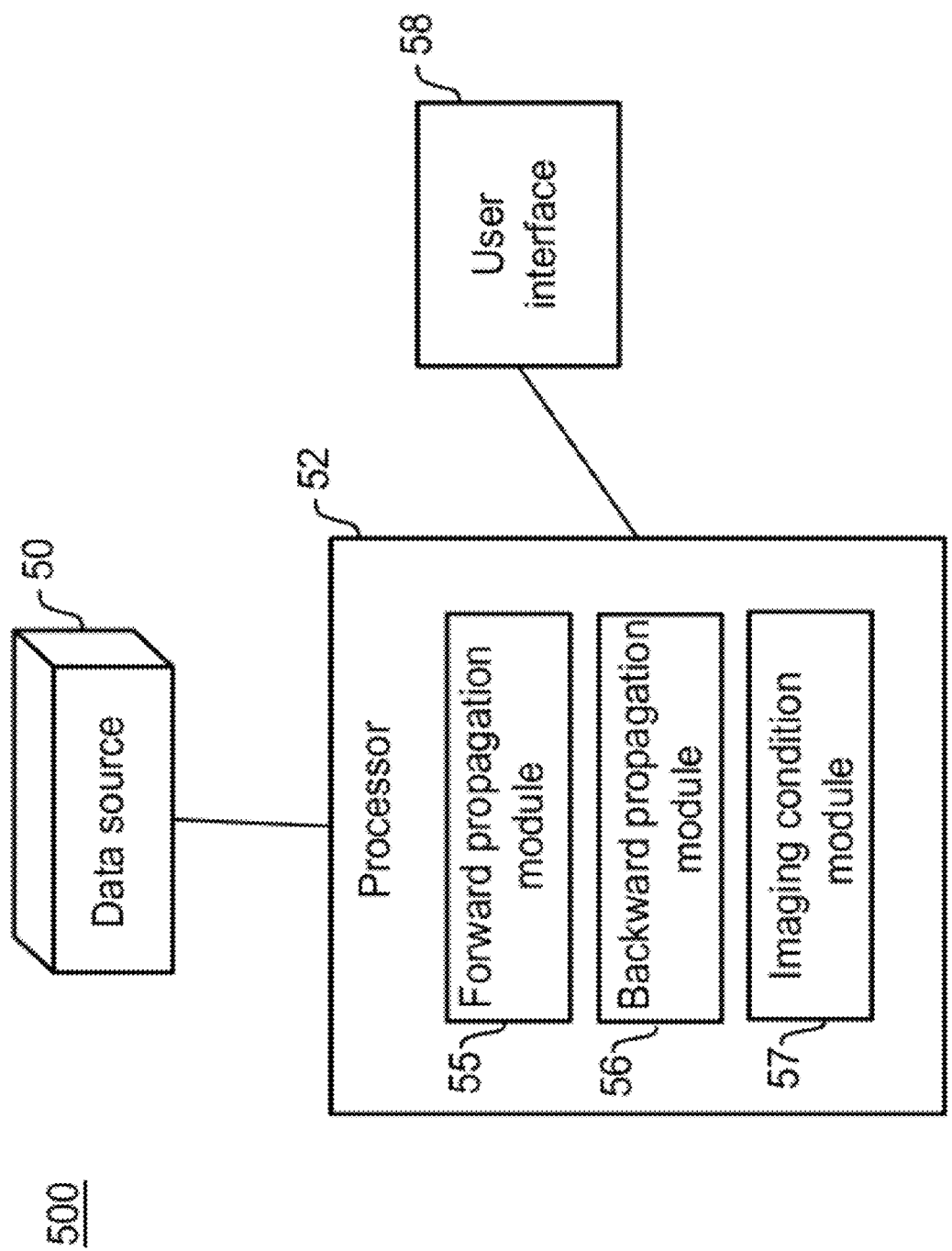
FIG. 5 schematically illustrates a system for performing a method in accordance with an embodiment of the invention.

A system 500 for performing the method is schematically illustrated in FIG. 5. The system includes a data storage device or memory 50. The stored data, such as seismic data and an earth model, may be made available to a processor 52, such as a programmable general purpose computer. The processor 52 is configured to execute a forward propagation module 55, a backward propagation module 56, and an imaging condition module 57. These modules may be implemented separately or as part of one or more inclusive modules. The forward propagation module 55 may be the adjoint operation of the backward propagation module 56, and the propagation operations may be done within one inclusive module. Using the modules, the processor 52 executes the method of the present invention. The processor is also configured to be in communication with the user interface 58. The user interface may be used both to display data and processed data products and to allow the user to select among options for implementing aspects of the method. The wavefields and images computed on the processor 52 may be displayed on the user interface 58, stored on the data storage device or memory 50, or both displayed and stored.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

What is claimed is:

1. A computer-implemented method for generating images of a subsurface region, comprising:
    obtaining seismic data and an earth model related to the subsurface region;
    forward propagating, via a computer, a source wavefield through the earth model for a limited time range dependent on a first travel time and a second travel time wherein the limited time range is between the first travel time and the second travel time subtracted from a maximum travel time;
    backward propagating, via a computer, a receiver wavefield through the earth model for the limited time range dependent on the first travel time and the second travel time wherein the limited time range is between the first travel time and the second travel time subtracted from the maximum travel time; and
    applying, via a computer, an imaging condition to the forward propagated source wavefield and backward propagated receiver wavefield to generate images related to the subsurface region.

2. The method of claim 1, wherein the first travel time is a length of time taken by seismic energy to travel from a seismic source to an image point in the subsurface region and the second travel time is a length of time taken by seismic energy to travel from a seismic receiver to the image point in the subsurface region.

3. A system for generating images of a subsurface region, comprising:
    a data source containing information related to the subsurface region; and
    at least one computer processor being configured to communicate with the data source and to execute computer program modules, the computer modules comprising:
        i. a forward propagation module dependent on a limited time range wherein the limited time range is between a first travel time and a second travel time subtracted from a maximum travel time;
        ii. a backward propagation module dependent on the limited time range range wherein the limited time range is between the first travel time and the second travel time subtracted from the maximum travel time; and
        iii. an imaging condition module.

4. The system of claim 3 further comprising a user interface.

5. The system of claim 3, wherein the first travel time is a length of time taken by seismic energy to travel from a seismic source to an image point in the subsurface region and the second travel time is a length of time taken by seismic energy to travel from a seismic receiver to the image point in the subsurface region.

6. An article of manufacture comprising a computer readable medium having a computer readable code embodied therein, the computer readable program code adapted to be executed to implement a method for estimating fluid distribution in a subterranean reservoir, the method comprising:
    forward propagating a source wavefield through the earth model for a limited time range dependent on a first travel time and a second travel time wherein the limited time range is between the first travel time and the second travel time subtracted from a maximum travel time;
    backward propagating a receiver wavefield through the earth model for the limited time range dependent on the first travel time and the second travel time wherein the limited time range is between the first travel time and the second travel time subtracted from the maximum travel time; and
    applying an imaging condition to the forward propagated source wavefield and backward propagated receiver wavefield to generate images related to the subsurface region.

7. The method of claim 6, wherein the first travel time is a length of time taken by seismic energy to travel from a seismic source to an image point in the subsurface region and the second travel time is a length of time taken by seismic energy to travel from a seismic receiver to the image point in the subsurface region.

* * * * *